(12) United States Patent
Williams et al.

(10) Patent No.: US 8,382,150 B2
(45) Date of Patent: Feb. 26, 2013

(54) EASY LOCK AND RELEASE MECHANISM FOR A SAFETY SEAT RETAINING ON A STROLLER FRAME AND A BASE

(75) Inventors: Bruce Williams, Narvon, PA (US); Andrew Lehman, Lancaster, PA (US); Scott Anderson, East Earl, PA (US)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 112 days.

(21) Appl. No.: 13/070,307

(22) Filed: Mar. 23, 2011

(65) Prior Publication Data

US 2011/0233903 A1    Sep. 29, 2011

(30) Foreign Application Priority Data

Mar. 24, 2010 (CN) ...................... 2010 2 0152564 U (51) Int. Cl.
*B62B 7/14* (2006.01)
(52) U.S. Cl. ........ 280/648; 280/647; 280/650; 280/657; 280/658; 280/47.18; 280/47.25; 280/47.38; 280/47.39
(58) Field of Classification Search ............... 280/47.17, 280/47.18, 47.25, 47.34, 47.38, 47.39, 647, 280/648, 650, 657, 658; 297/253, 256.16, 297/130; 403/108, 326, 327; 296/35.3, 35.4, 296/351.1; 224/409
See application file for complete search history.

(56) References Cited

U.S. PATENT DOCUMENTS

| | | | | |
|---|---|---|---|---|
| 525,908 A * | 9/1894 | Klauberg | ................ | 296/35.4 |
| 2,875,815 A * | 3/1959 | Gill | ................ | 297/153 |
| 4,903,980 A * | 2/1990 | Schwartz | ................ | 280/658 |
| 5,004,253 A * | 4/1991 | Nakao et al. | ................ | 280/47.38 |
| 5,772,279 A * | 6/1998 | Johnson, Jr. | ................ | 297/130 |
| 5,947,555 A * | 9/1999 | Welsh et al. | ................ | 297/130 |
| 5,964,501 A * | 10/1999 | Magnani | ................ | 297/174 R |
| 6,070,890 A * | 6/2000 | Haut et al. | ................ | 280/47.38 |
| 6,120,041 A * | 9/2000 | Gehr et al. | ................ | 280/30 |
| 6,398,233 B1 * | 6/2002 | Liang et al. | ................ | 280/30 |
| 6,572,134 B2 * | 6/2003 | Barrett et al. | ................ | 280/650 |
| 7,004,541 B2 * | 2/2006 | Sedlack | ................ | 297/256.13 |
| 2005/0264062 A1 * | 12/2005 | Longenecker et al. | .... | 297/250.1 |
| 2008/0136127 A1 * | 6/2008 | Chen et al. | ................ | 280/30 |

FOREIGN PATENT DOCUMENTS

EP    1918155 A2 *   5/2008

* cited by examiner

*Primary Examiner* — J. Allen Shriver, II
*Assistant Examiner* — Steve Clemmons
(74) *Attorney, Agent, or Firm* — Morris Manning & Martin, LLP; Tim Tingkang Xia, Esq.

(57) ABSTRACT

An easy lock and release mechanism for a safety seat retaining on a stroller frame and a base. A front confinement is mounted on the stroller frame, and has a spring-loaded latch retractively protruding from a rear wall of the front confinement for locking the safety seat. The safety seat has two anchoring slots, at least a downward holding slot and two latching elements. The downward holding slot has an orifice formed therein for engaging with the spring-loaded latch. The two anchoring slots may anchor to two transversal bars on the base and be locked by the two latching elements. The release mechanism is mounted on the safety seat, and has a release actuator associated with a pushing element and the two latching elements for pushing the spring-loaded latch away from the orifice and unlock the two latching elements.

20 Claims, 10 Drawing Sheets

EASY LOCK AND RELEASE MECHANISM FOR A SAFETY SEAT RETAINING ON A STROLLER FRAME AND A BASE

CROSS-REFERENCE TO RELATED APPLICATIONS

This non-provisional application claims priority under 35 U.S.C. §119(a) on Patent Application No(s). 201020152564.4 filed in China, P.R.C. on Mar. 24, 2010, the entire contents of which are hereby incorporated by reference.

FIELD OF THE INVENTION

The present invention relates generally to an easy lock and release mechanism for a safety seat retaining on a stroller frame and a base, especially to a safety seat which can be unlocked from either a stroller frame or a base easily and simply by pulling a single release actuator.

BACKGROUND OF THE INVENTION

Safety seats are products especially designed for seating a small child in a car. As car accident is one of the main causes of injury to small children, and the safety car seat can effectively reduce such suffering, hence when carrying a small child in the car, a safety seat must be setup to accommodate the child. In addition, the safety seat must be selected according to the age and physical size of the child to ensure effective protection for the child.

To avoid the inconvenience of carrying the safety seat, there are products on the market for coupling the safety seat to a stroller so that the safety seat not only can be used in the car but also may be directly mounted onto the stroller for moving the safety seat as desired.

The use of stroller and safety seat devices is known in the prior art. U.S. Pat. No. 5,567,008 describes a detachable infant seat which may be removed from a base secured on a vehicle seat. Releasing such an infant seat from the base requires both hands to grasp the infant seat and press two release buttons which located on both side of the infant seat, and then can lift the infant seat upward from the base. However, once a care-giver has using both hands to push the two release buttons, shall have no other hand to grab the handle to lift the infant seat.

SUMMARY OF THE INVENTION

To diminish such a troublesome and simply the manipulation, the present invention provides an easy lock and release mechanism for a safety seat retaining on a stroller frame and a base, comprising a base, a stroller frame, a safety seat, and a release mechanism. The base has two transversal bars for detachably connecting with the safety seat. The stroller frame has two sides, two spring-loaded latches and a front confinement. The front confinement is stretched between the two sides of the stroller frame. The spring-loaded latch is projectively and retractively mounted at the front confinement for detachably connecting with the safety seat. The safety seat has a front end, a rear end, two anchoring slots, two latching elements and two positioning protrusions, the two positioning protrusions protruded downwardly for resting within the positioning indent and each formed with an orifice for engaging with the spring-loaded latch thereby retaining the safety seat on the stroller frame. The two anchoring slots is capable of anchoring on the two transversal bars and locked by the two latching elements. The release mechanism has a release actuator, two pushing elements and two flexible lengths; wherein the pushing element is driven by the release actuator for pushing the spring-loaded latch away from the orifice thereby releasing the safety seat from the stroller frame. The two flexible lengths each having one end connected with the release actuator and another end for connected with the two latching elements for unlocking the two transversal bars from the two anchoring slots.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention; examples of which are illustrated in the accompanying drawings.

Referring to FIGS. 1 to 5, the prefer embodiment of the easy lock and release mechanism 4 for a safety seat according to the present invention is adapted for retaining a safety seat 3 on a stroller frame 10.

Figure 1:
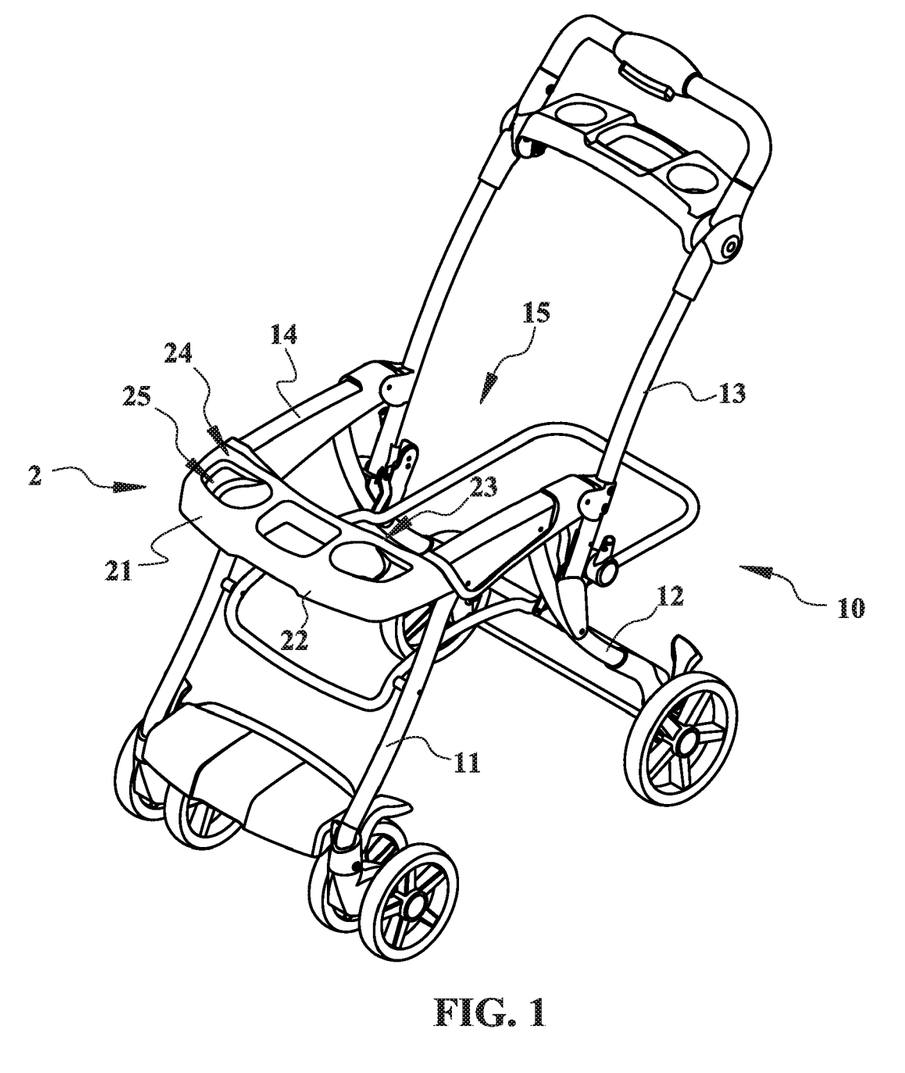
FIG. 1 is a perspective view showing a stroller frame equipped with a front confinement for a safety seat retaining thereon according to the present invention.
Figure 2:
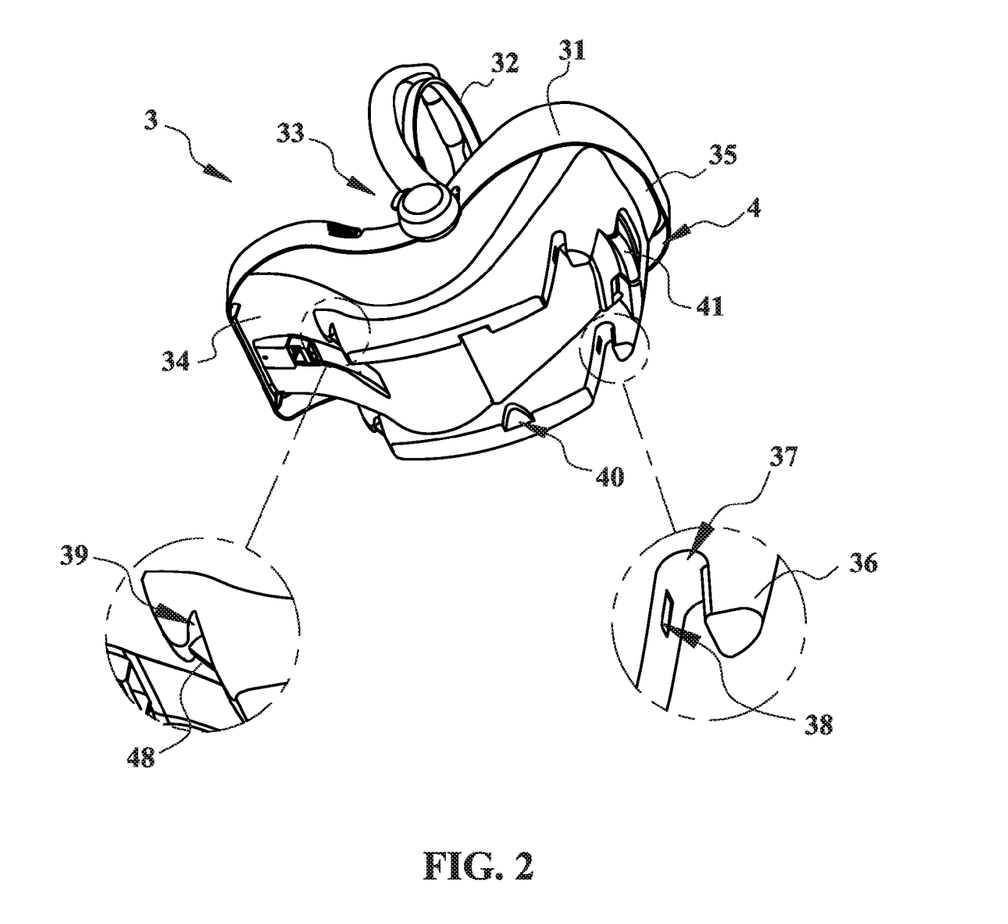
FIG. 2 is a perspective view showing a better embodiment of safety seat according to the present invention.

Referring to FIG. 1, the stroller frame 10 comprises at least a front strut 11, a pair of rear struts 12, a pair of armrests 14, two push bars 13 and a front confinement 2 stretched between the two sides of the front end of the stroller frame 10.

Figure 3:
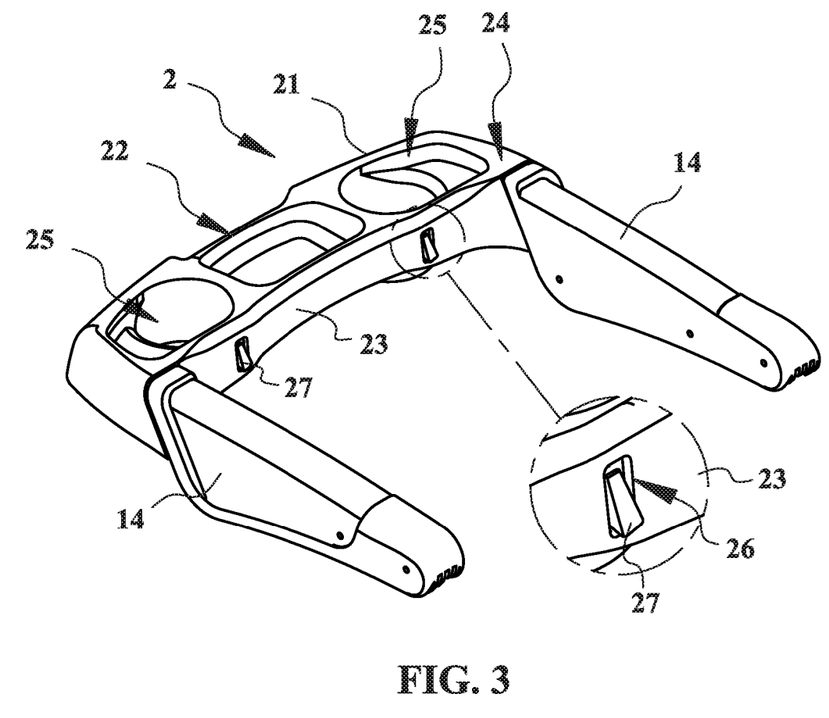
FIG. 3 is a perspective view showing the embodiment of the front confinement according to the present invention.

Referring to FIG. 3, the front confinement 2 may be embodied as a food tray 21 connected at the armrests 14 for serving and protecting a little occupant inside the stroller. The front confinement 2 is formed with two positional indents 25 on the upper wall 24 and mounted with two spring-loaded latches 27.

Figure 4:
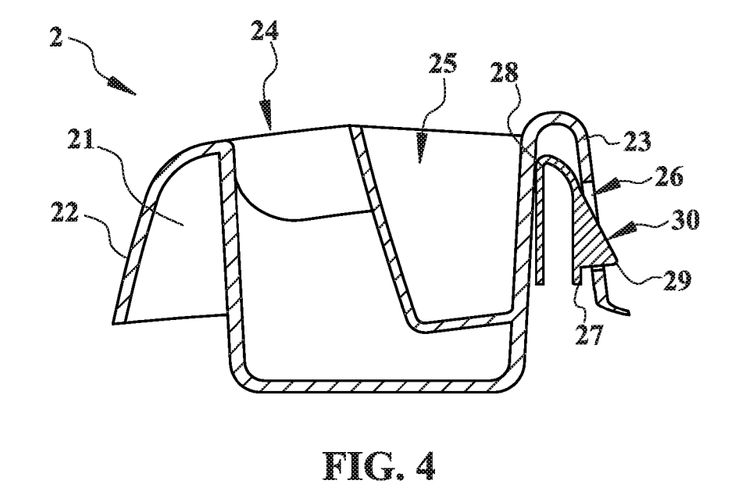
FIG. 4 is a cross-sectional view showing a spring-loaded latch installed at the front confinement according to the present invention.
Figure 8:
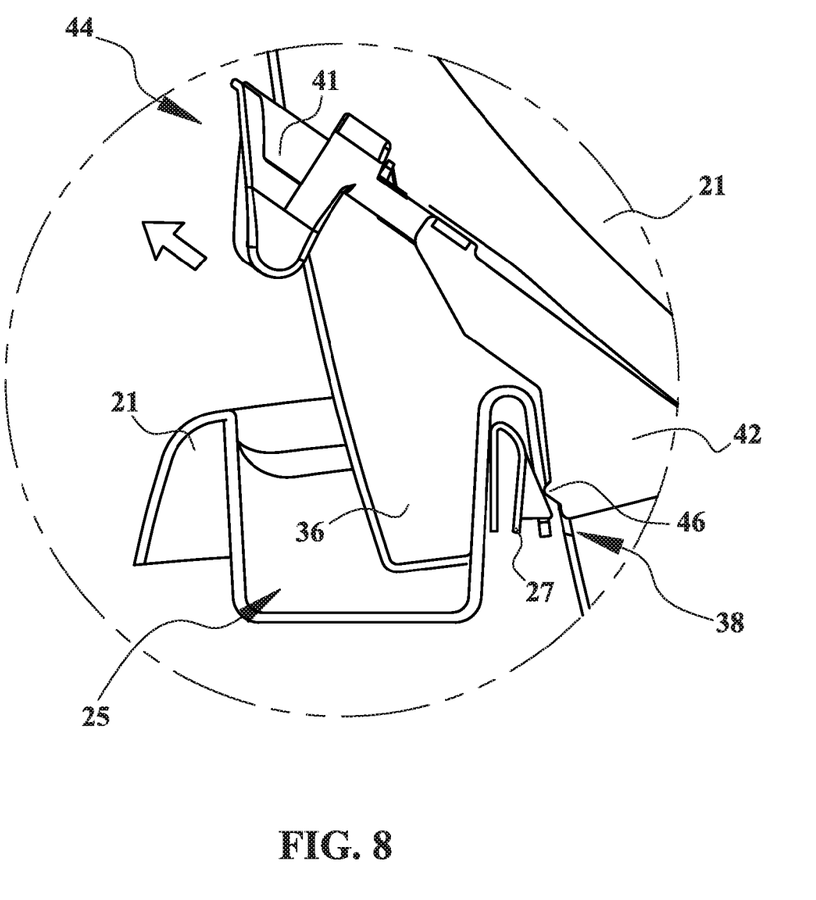
FIG. 8 is a schematic cross-sectional view showing the release of the safety seat.

Referring to FIGS. 4 and 8, the front confinement 2 comprises a front wall 22, a rear wall 23 and an upper wall 24 formed with the two positional indents 25 thereon. The two spring-loaded latches 27 are mounted in the front confinement 2 and each has a protruded engaging portion 29 retractively protruded from the rear wall 23. The spring-loaded latches 27 each may include a biasing portion 28 and a protruded engaging portion 29 with a slant surface 30, the biasing portion 28 biasing on the protruded engaging portion 29 outwardly from a through hole 26 formed at the front confinement 2. The biasing portion 28 may be embodied as a spring; however, the biasing portion 28 may also be formed integrally with the protruded engaging portion 29.

Referring back to FIG. 2, the embodiment of safety seat 3 according to the present invention includes a main body 31 which has at least a front end 34, a rear end 35, an accommodating space 33, and two positioning protrusions 36. Each of the two positioning protrusions 36 protrudes downwardly for resting inside the positioning indent 25 on the front confinement 2 and forms a downward holding slot 37. The two positioning protrusions 36 each is formed with an orifice 38 on one side wall of the downward holding slot 37 for snap engaging with the protruded engaging portion 29, and the rear wall 23 of the front confinement 2 is formed with two through holes 26 that permits the two spring-loaded latches 27 projecting therethrough for snapping into the two orifices 38 respectively so as to detachably lock the safety seat 3, and retain the safety seat 3 on the stroller frame 10, as shown in FIG. 8.

Figure 5:
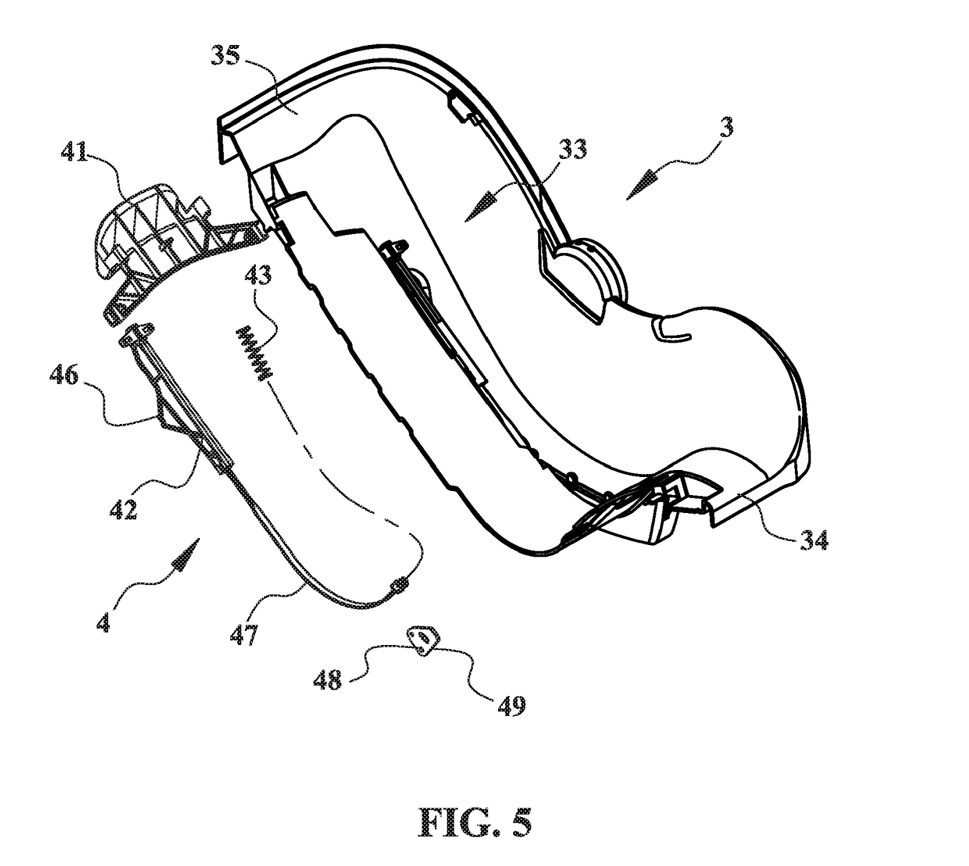
FIG. 5 is an exploded with partial cross-sectional view showing a safety seat equipped with a release mechanism according to the present invention.

As shown in FIG. 5, the release mechanism 4 is operatively mounted on the safety seat 3, and includes at least a release actuator 41 and two pushing elements 42. The pushing elements 42 are connected and driven by the release actuator 41, and each formed with a protrusion 46 for pushing the protruded engaging portion 29 of the spring-loaded latch 27 away from the orifice 38 while being driven by the release actuator 41 thereby releasing the safety seat 3 from the stroller frame 10.

Figure 6:
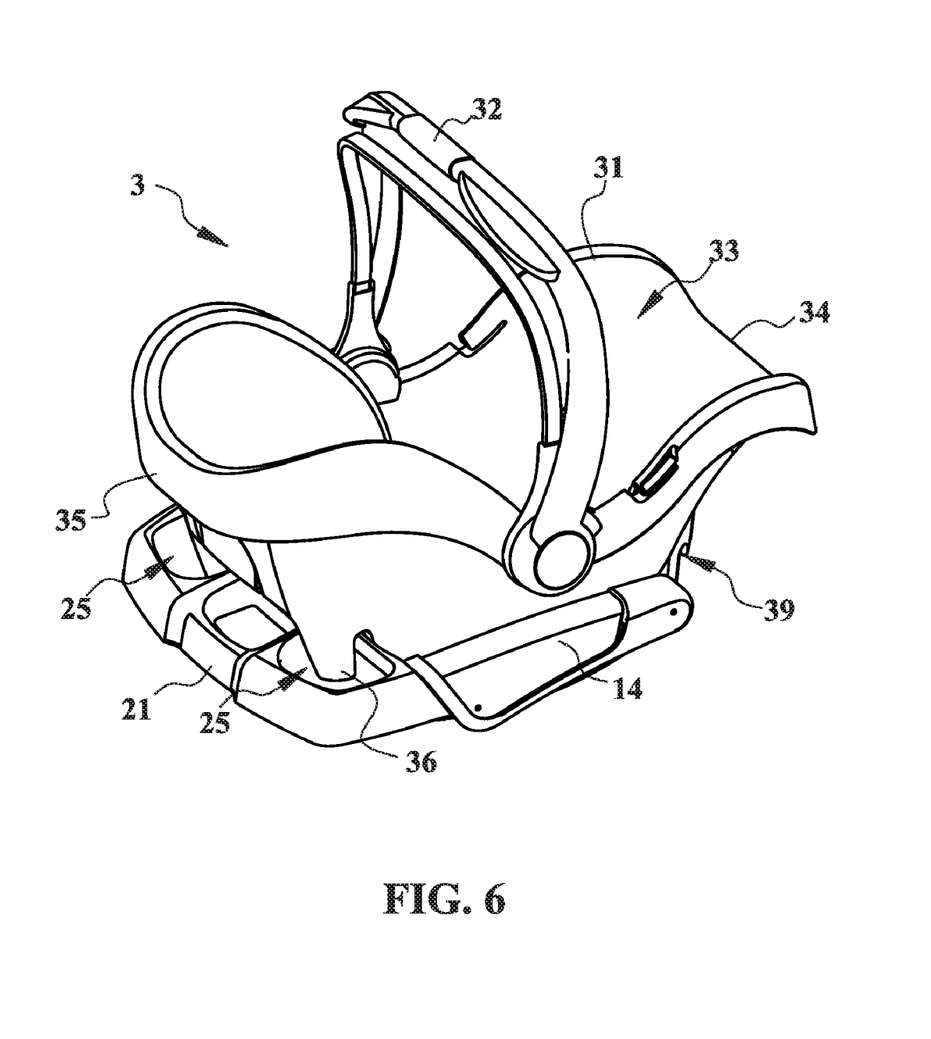
FIG. 6 is a schematic perspective view showing a safety seat being retained on a base according to the present invention.
Figure 9:
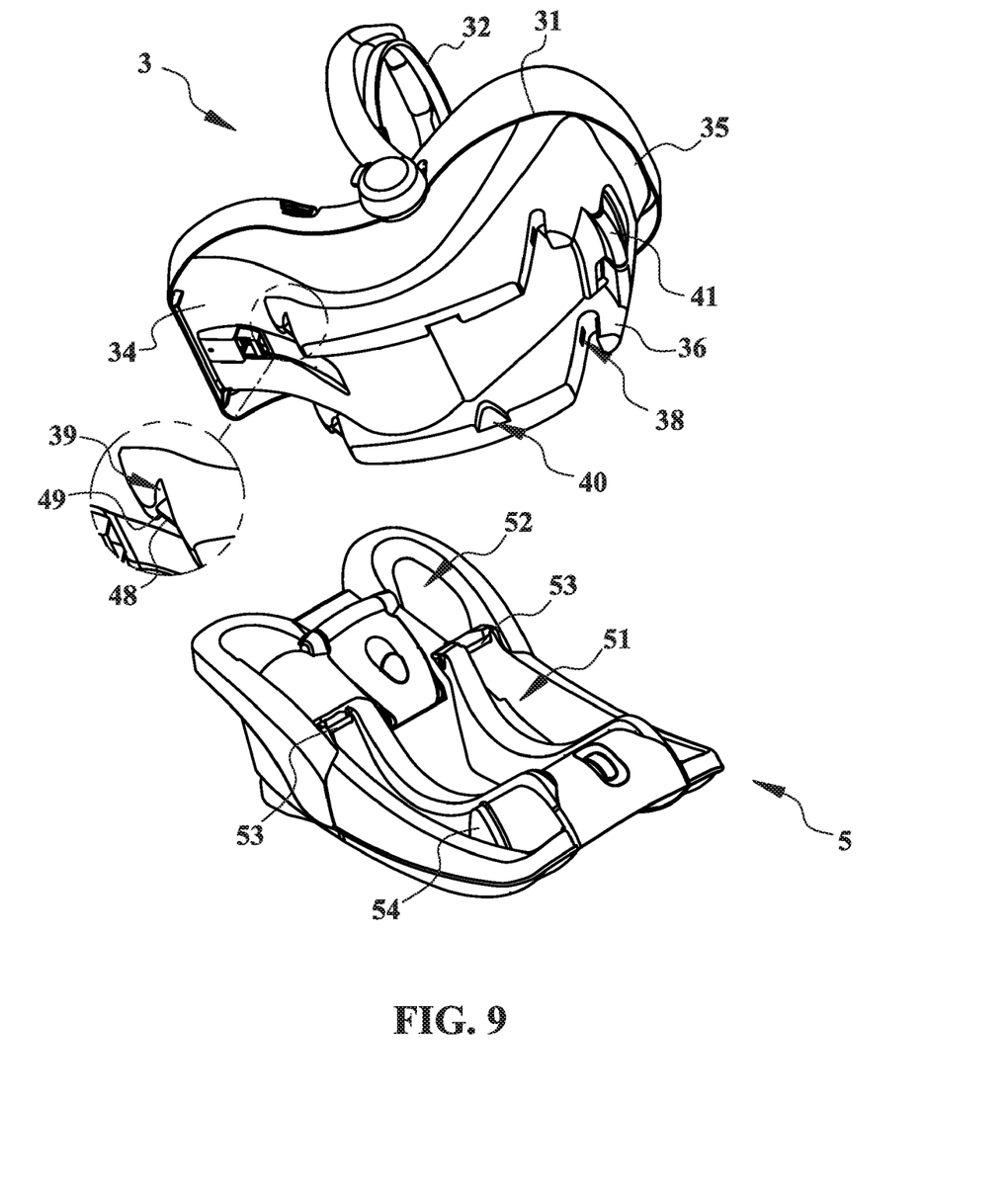
FIG. 9 is a schematic cross-sectional view showing the release of the safety seat from the base.

Preferably, the safety seat 3 may further include two anchoring slots 39, two latching elements 48 for retaining on a base 5 as shown in FIGS. 6 and 9, and the release mechanism 4 may further include two flexible lengths 47 connected with the release actuator 41 for driving the two latching elements 48 away from the two anchoring slots 39. Preferably, the two flexible lengths 47 may be formed integrally with the two pushing elements 42 respectively. Further, the two latching elements 48 each may have an outer edge 49 for slidably contacting and pushed by the two transversal bars 53 when the safety seat 3 is loading onto the base 5.

Referring again to FIG. 9, the base 5 is formed with two through holes 52 and two supporting indents 51 and equipped with two transversal bars 53 for detachably locking by the two latching elements 48 and then retained within the anchoring slots 39 of the safety seat 3. By this way, the two anchoring slots 39 can hold the two transversal bars 53 and be locked by the two latching elements 48.

Figure 7:
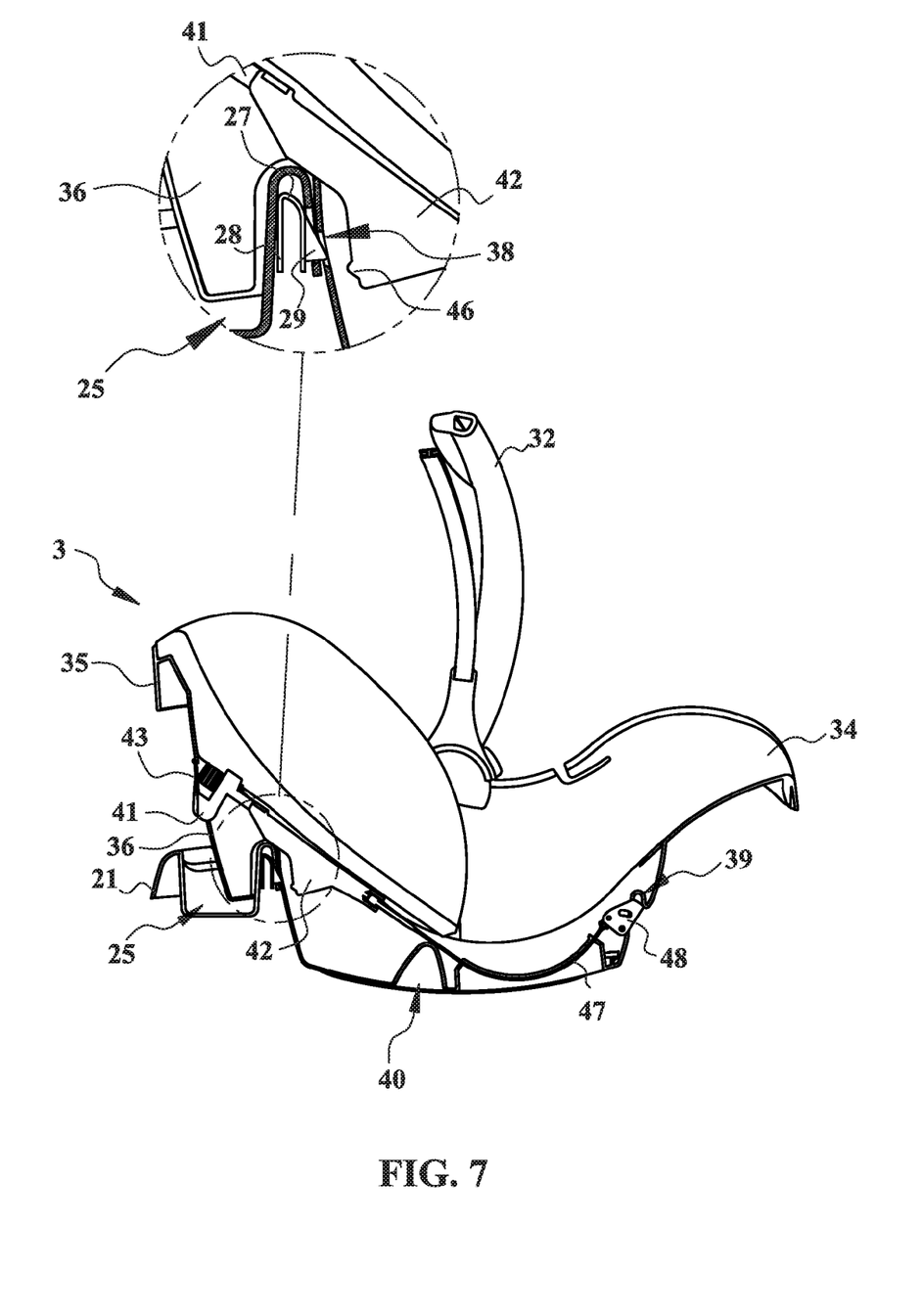
FIG. 7 is a schematic side view showing the engagement of the safety seat and the base according to the present invention.

Preferably, as shown in FIG. 7, the base 5 may also be formed with two positioning indents 25 each being equipped with a spring-loaded latch 27, just as the same of the front confinement 2. When the safety 3 is resting onto the base 5, the positioning protrusions 36 will insert into the positioning indents 25 respectively and the spring-loaded latch 27 will protrude and insert into the orifice 38 automatically; in the meantime, when the safety 3 is moving downward, the transversal bars 53 will push the latching element 48 away and entering into the anchoring slots 39, and then locked by the latching element 48 thereafter.

Figure 10:
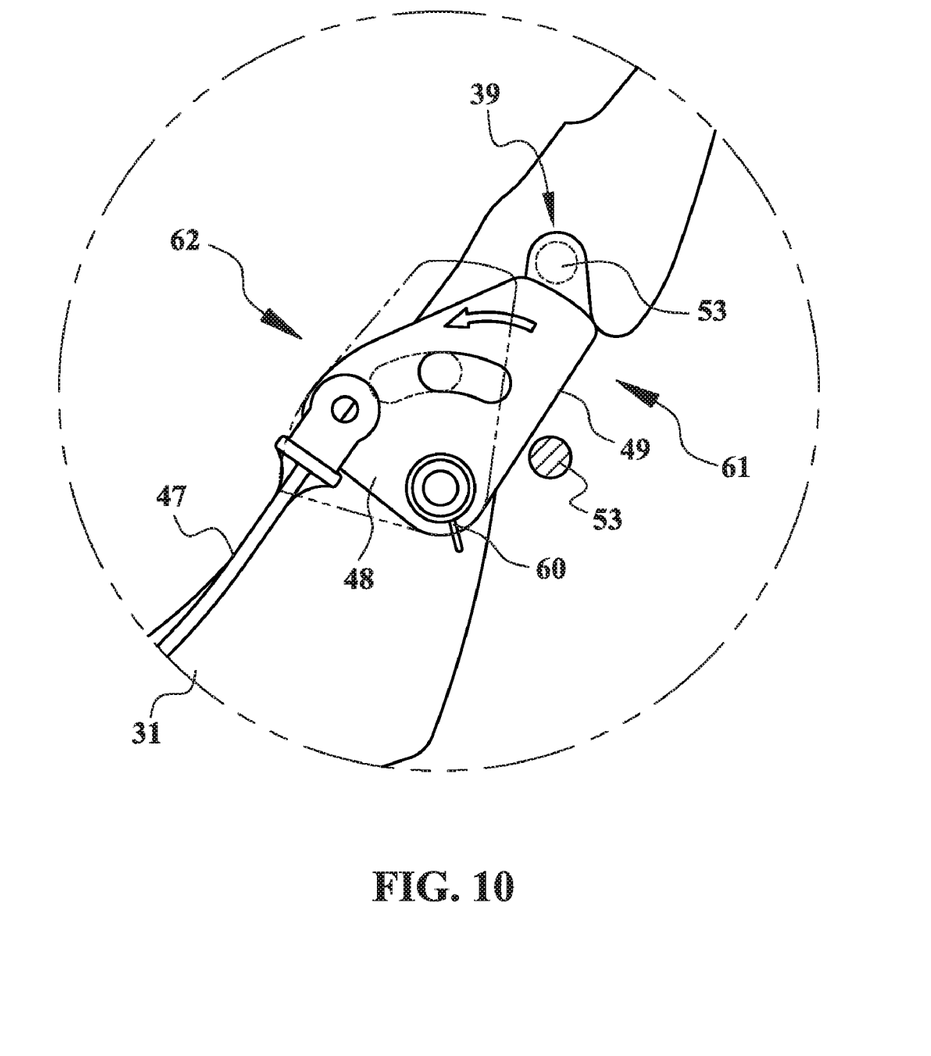
FIG. 10 is a schematic view showing the release mechanism of the safety seat.

As shown in FIG. 10, the latching elements 48 are pivoted near the anchoring slots 39 and each is biased by a biasing element 60 toward a locked position 61, and can be driven by the flexible length 47 to a released position 62. The two latching elements 48 each has an outer edge 49 for slidably contacting and pushed by the two transversal bars 53 when the safety seat 3 is loading on the base 5.

Referring to FIGS. 8 to 10, when the care-giver needs to release the safety 3 from the base 5 or the stroller frame 10, the release actuator 41 can be pulled outwardly to drive the pushing element 42 and the flexible length 47 to move, so as to push the spring-loaded latch 27 away from the orifice 38 and rotate the latching elements 48 to release the transversal bars 53 from the anchoring slots 39 simultaneously. Preferably, the release actuator 41 may be formed as a handle and biased by a resilient element 43 toward an idle position before being pulled outwardly.

Figure 11:
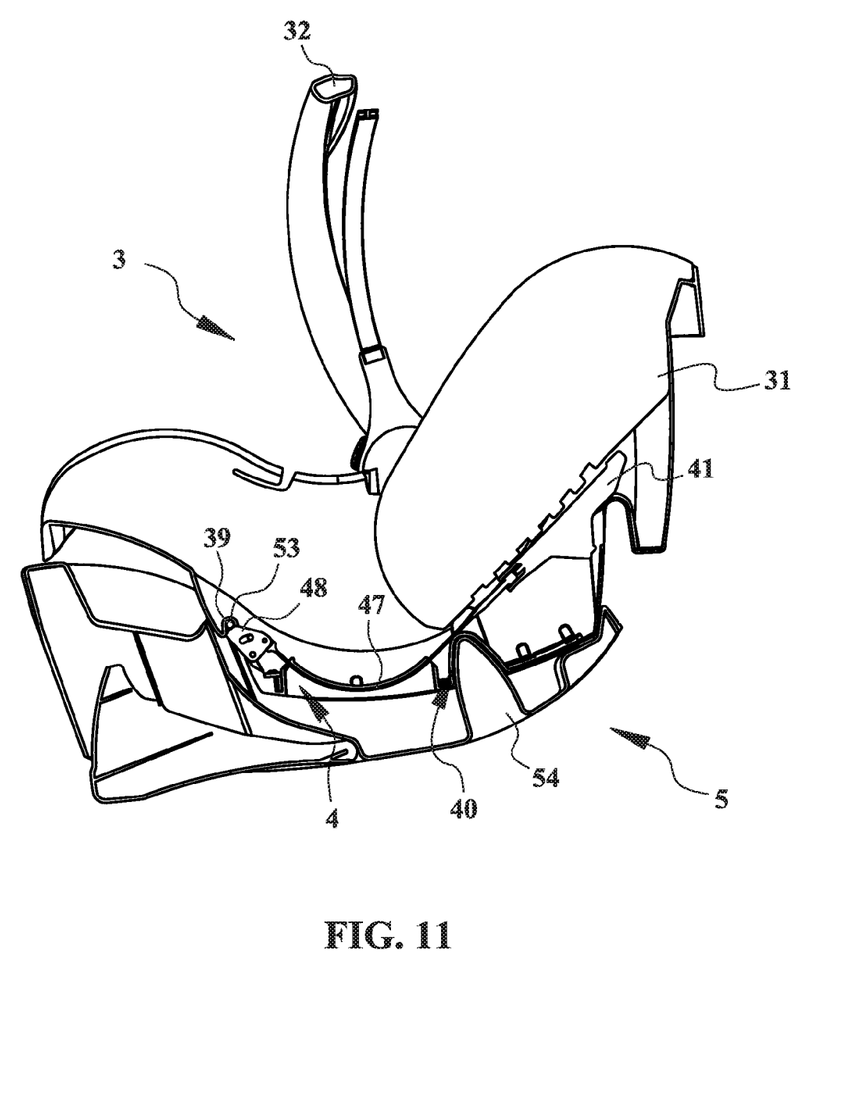
FIG. 11 is a schematic partial cross-sectional view showing the safety seat being retained on a base

Referring to FIG. 11, the safety seat 3 may be formed with a guiding slot 40 and pivoted with a handle 32, and the safety seat 3 may be formed with a guiding slot 40, and the base 5 may be formed with a guiding protrusion 54 for matching with the guiding slot 40 thereby guiding the safety seat 3 to a position that permits the anchoring slot 39 aligned with the transversal bars 53 automatically.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. An easy lock and release mechanism for a safety seat retaining on a stroller frame, comprising:
   a stroller frame, having two sides, at least a spring-loaded latch and a front confinement; wherein the front confinement has a rear wall and is stretched between the two sides of the stroller frame; and the spring-loaded latch is mounted in the front confinement and has a protruded engaging portion retractively protruded from the rear wall of the front confinement;
   a safety seat, having a front end and a rear end, and formed with an orifice at the rear end for snap engaging with the protruded engaging portion of the spring-loaded latch thereby retaining the safety seat on the stroller frame; and
   a release mechanism, operatively mounted on the safety seat, having a release actuator and a pushing element; wherein the pushing element can be driven by the release actuator for pushing the protruded engaging portion of the spring-loaded latch away from the orifice thereby releasing the safety seat from the stroller frame.

2. The easy lock and release mechanism for a safety seat retaining on a stroller frame according to claim 1, wherein the front confinement is a food tray which being formed with at least a positioning indent.

3. The easy lock and release mechanism for a safety seat retaining on a stroller frame according to claim 2, wherein the safety seat having a positioning protrusion for resting within the positioning indent thereby guiding the spring-loaded latch to align with the orifice.

4. The easy lock and release mechanism for a safety seat retaining on a stroller frame according to claim 1, wherein the front confinement is formed with the rear wall and an upper wall, and the upper wall is formed with at least a positioning indent for guiding the safety seat to a position that permits spring-loaded latch aligned with the orifice.

5. The easy lock and release mechanism for a safety seat retaining on a stroller frame according to claim 4, wherein the rear wall is formed with at least a through hole for permitting the spring-loaded latch projecting and retracting therethrough.

6. The easy lock and release mechanism for a safety seat retaining on a stroller frame according to claim 5, wherein the spring-loaded latch further includes a biasing portion, the biasing portion biasing the protruded engaging portion to project outwardly from the through hole.

7. The easy lock and release mechanism for a safety seat retaining on a stroller frame according to claim 6, wherein the biasing portion is formed integrally with the protruded engaging portion.

8. The easy lock and release mechanism for a safety seat retaining on a stroller frame according to claim 1, wherein the release actuator is a handle.

9. An easy lock and release mechanism for a safety seat retaining on a stroller frame and a base, comprising:
   a base, having two transversal bars;
   a stroller frame, having two sides, two spring-loaded latches and a front confinement, wherein the front confinement has a rear wall and is stretched between the two sides of the stroller frame; and wherein both of the spring-loaded latches are mounted in the front confinement and having a protruded engaging portion retractively protruded from the rear wall of the front confinement;
   a safety seat, having a front end, a rear end, two anchoring slots, two latching elements and two positioning protrusions; the two positioning protrusions protruded downwardly for resting inside a positioning indent formed on the front confinement; the two positioning protrusions each formed with an orifice for engaging with the spring-loaded latch thereby retaining the safety seat on the stroller frame; the two anchoring slots being capable of holding the two transversal bars and locked by the two latching elements; and
   a release mechanism, having a release actuator, two pushing elements and two flexible lengths; wherein the pushing element can be driven by the release actuator for pushing the spring-loaded latch away from the orifice thereby releasing the safety seat from the stroller frame, the two flexible lengths each having one end connected with the release actuator and another end for connected with the two latching elements respectively for unlocking the two transversal bars from the two anchoring slots.

10. The easy lock and release mechanism for a safety seat retaining on a stroller frame and a base according to claim 9, wherein the two latching elements each has an outer edge for slidably contacting and pushed by the two transversal bars when loading the safety seat on the base.

11. The easy lock and release mechanism for a safety seat retaining on a stroller frame and a base according to claim 9, wherein the two flexible lengths are formed integrally with the two pushing elements respectively.

12. The easy lock and release mechanism for a safety seat retaining on a stroller frame and a base according to claim 9, wherein the release actuator is a handle biased by a resilient element toward an idle position.

13. The easy lock and release mechanism for a safety seat retaining on a stroller frame and a base according to claim 9, wherein the safety seat is formed with a guiding slot, and the base is formed with a guiding protrusion for matching with the guiding slot thereby guiding the safety seat to a position that permits the anchoring slot aligned with the transversal bars.

14. The easy lock and release mechanism for a safety seat retaining on a stroller frame and a base according to claim 9, wherein the latching elements are pivoted near the anchoring slot respectively for releasably locking the transversal bars in the anchoring slots.

15. An easy lock and release mechanism for a safety seat retaining on a stroller frame, comprising:
   a stroller frame, having two sides, at least a spring-loaded latch and a front confinement; wherein the front confinement is stretched between the two sides of the stroller frame; and the spring-loaded latch is projectively and retractively mounted at the front confinement;
   a safety seat, having a front end and a rear end, and formed with an orifice at the rear end for snap engaging with the spring-loaded latch thereby retaining the safety seat on the stroller frame; and
   a release mechanism, having a release actuator and a pushing element; wherein the pushing element can be driven by the release actuator for pushing the spring-loaded latch away from the orifice thereby releasing the safety seat from the stroller frame,
   wherein the front confinement is formed with a rear wall and an upper wall, and the upper wall is formed with at least a positioning indent for guiding the safety seat to a position that permits spring-loaded latch aligned with the orifice, and
   wherein the rear wall is formed with at least a through hole for permitting the spring-loaded latch projecting and retracting therethrough.

16. The easy lock and release mechanism for a safety seat retaining on a stroller frame according to claim 15, wherein the front confinement is a food tray which being formed with at least a positioning indent.

17. The easy lock and release mechanism for a safety seat retaining on a stroller frame according to claim 16, wherein the safety seat having a positioning protrusion for resting within the positioning indent thereby guiding the spring-loaded latch to align with the orifice.

18. The easy lock and release mechanism for a safety seat retaining on a stroller frame according to claim 15, wherein the spring-loaded latch includes a biasing portion and a protruded engaging portion, the biasing portion biasing the protruded engaging portion to project outwardly from the through hole.

19. The easy lock and release mechanism for a safety seat retaining on a stroller frame according to claim 18, wherein the biasing portion is formed integrally with the protruded engaging portion.

20. The easy lock and release mechanism for a safety seat retaining on a stroller frame according to claim 15, wherein the release actuator is a handle.

* * * * *